Patented Apr. 26, 1932

1,855,464

UNITED STATES PATENT OFFICE

LEON W. BABCOCK, OF KENVIL, NEW JERSEY, ASSIGNOR TO HERCULES POWDER COMPANY, OF WILMINGTON, DELAWARE, A CORPORATION OF DELAWARE

METHOD OF PRODUCING FERMENTABLE SUGARS AND ALCOHOL FROM WOOD

No Drawing. Application filed July 30, 1927. Serial No. 209,648.

My invention relates to a method for producing fermentable sugars and alcohol from wood and more particularly relates to the treatment of pine wood for the production of alcohol.

Heretofore it has been known to produce alcohol from wood by treatment involving chipping of the wood, digestion with an acid, as for example, sulphuric acid of low concentration, extraction of the liquids containing acid and fermentable sugars, neutralization of the acid, as with an alkali, and fermentation of the fermentable sugars to alcohol. Such treatment is costly and involves large investment in apparatus so that alcohol cannot be economically produced thereby except when it is in demand at a high price.

Now in accordance with my invention I have discovered that if wood, preferably ground or chipped relatively fine, be subjected in a closed container to a fluid under high pressure and at a high temperature for a time sufficient for the pressure to permeate or to equalize within and without the wood particles, but insufficient for the high temperatures to effect charring or disintegration of the wood, and then the pressure be released, substantial quantities of fermentable sugars will be formed, which may be fermented to ethyl alcohol in place, or after extraction from the wood fibre formed. The fibre produced, when the sugars are extracted before fermentation, may be subjected to digestion with an acid of low concentration, extracted and neutralized for the recovery of further quantities of sugar, or it may be utilized for the production of wall board and other articles for which wood fibre or pulp is adaptable.

In carrying out the method embodying my invention a quantity of wood, as for example, pine wood, is placed in a closed container, adapted to withstand high pressure, and an elastic fluid under high pressure and temperature admitted to the container. The fluid may, for example, be steam, air, or the like, and may be at a pressure from 275 to 600 pounds per square inch or even higher, say as high as 1000 pounds per square inch, though a pressure of from about 325 to about 700 pounds per square inch will suffice as preferable. The temperature of the fluid should be from about 218° C. to about 262° C. The fluid under pressure should be permitted to act on the wood in the container for a short period, say from about ½ to about 5 seconds, and care should be taken to prevent the heated fluid from charring or effecting disintegration of the wood. At the end of the heating period the wood should be discharged from the container, under the pressure within the container, into an area of relatively low pressure, say for example, atmospheric pressure. The treatment of the wood in the container under high pressure and temperature results in the formation of fermentable sugars and the wood as it is discharged from the container is disintegrated, or, as it were, exploded, by the internal pressure, which acts to tear apart the fibres of the particles. The disintegrated or fibrous product thus obtained and containing the fermentable sugars formed may be treated directly for the fermentation of the fermentable sugars to alcohol, or the fermentable sugars may be extracted from the fibrous product and then fermented to alcohol.

In the treatment of the disintegrated or fibrous wood for the fermentation of the fermentable sugars to alcohol, for example, to 250 parts of the wood product (162.5 parts dry wood fibre) there is added 1500 parts of distilled water and 10 parts of malt sprouts to furnish the necessary nitrogen. This mixture is treated for say about one hour under 16 pounds live steam pressure and then cooled. The mixture is then inoculated with 50 parts of a 24 hour culture of yeast in 18° Brix molasses and incubated for 96 hours at 29° C. The mass is then distilled and will yield ethyl alcohol, in an amount from 7.02% to 7.24% based on the weight of dry wood used.

When it is desirable to utilize the disintegrated wood in which the fermentable sugars are found, or when it is desirable to extract rosin therefrom, the fermentable sugars are extracted from the disintegrated wood before fermentation. The fermentable sugars may be extracted by boiling the disintegrated wood with water and filtering, with repetition of the boiling treatment say four times. Such method of extraction will give from about 4% to 6% of the sugars. Alternatively the disintegrated wood may be exhausted in a Saxhlet extractor with a yield of 14% to 16% of the sugars, calculated as dextrose. The extracted sugars are fermented to alcohol in any well known manner and the alcohol obtained by distillation.

The disintegrated wood after extraction of the sugars may be dried and utilized as desired, for example, in the making of wall board, or it may be treated, as indicated, with acid hydrolysis and caused to yield an additional quantity of sugar.

In the carrying out of the method embodying my invention no particular form of apparatus is required.

Having now fully described my invention, what I claim and desire to protect by Letters Patent is:—

1. The method of producing fermentable sugars from wood, which includes subjecting wood in a closed container in the presence of moisture to the action of an elastic fluid at high temperature and pressure above 325 pounds per square inch and then releasing the pressure.

2. The method of producing fermentable sugars from wood, which includes subjecting wood in a closed container in the presence of moisture to the action of an elastic fluid at high temperature and pressure above 325 pounds per square inch for a period insufficient to cause substantial charring of the wood and then discharging the wood from the container under the pressure therein.

3. The method of producing fermentable sugars from wood, which includes subjecting wood in a closed container to the action of steam at high pressure above 325 pounds per square inch and then releasing the pressure.

4. The method of producing fermentable sugars from wood, which includes subjecting wood in a closed container to the action of steam at high pressure above 325 pounds per square inch and then discharging wood from the container while maintaining the pressure therein.

5. The method of producing fermentable sugars from wood, which includes subjecting wood in a closed container to the action of steam at high temperature and pressure above 325 pounds per square inch and then releasing the pressure before charring or disintegration of the wood occurs.

6. The method of producing fermentable sugars from wood, which includes subjecting pine wood in a closed container to the action of steam at high temperature and pressure above 325 pounds per square inch and releasing the pressure before charring or disintegration of the wood occurs.

7. The method of producing fermentable sugars from wood, which includes subjecting wood in a closed container in the presence of moisture to the action of an elastic fluid at a pressure of the order of 325–1000 pounds per square inch and at a temperature of the order of 218° C.–262° C. and discharging the wood from the container under the pressure therein in an area of relatively low pressure before charring or disintegration of the wood occurs.

8. The method of producing fermentable sugars from pine wood, which includes subjecting pine wood in a closed container to the action of steam at a pressure of the order of 325–1000 pounds per square inch and at a temperature of the order of 218° C.–262° C. and discharging the pine wood from the container under the pressure therein in an area of relatively low pressure before charring or disintegration of the pine wood occurs.

In testimony of which invention, I have hereunto set my hand, at Kenvil, New Jersey, on this 25th day of July, 1927.

LEON W. BABCOCK.